United States Patent
Mishourovsky et al.

(10) Patent No.: US 9,538,182 B2
(45) Date of Patent: Jan. 3, 2017

(54) APPARATUS AND METHOD FOR ADAPTIVE FRAME PREDICTION FOR MULTIVIEW VIDEO SEQUENCE CODING

(75) Inventors: Mikhail Mishourovsky, Yongin-si (KR); Alexey Fartukov, Yongin-si (KR); Igor Kovliga, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 379 days.

(21) Appl. No.: 13/978,842

(22) PCT Filed: Jan. 20, 2012

(86) PCT No.: PCT/KR2012/000553
§ 371 (c)(1),
(2), (4) Date: Jul. 9, 2013

(87) PCT Pub. No.: WO2012/099438
PCT Pub. Date: Jul. 26, 2012

(65) Prior Publication Data
US 2013/0294504 A1    Nov. 7, 2013

(30) Foreign Application Priority Data
Jan. 20, 2011  (RU) ................................ 2011102033

(51) Int. Cl.
*H04N 7/12* (2006.01)
*G06T 15/00* (2011.01)
(Continued)

(52) U.S. Cl.
CPC ...... *H04N 19/00769* (2013.01); *H04N 19/573* (2014.11); *H04N 19/597* (2014.11); *H04N 19/61* (2014.11)

(58) Field of Classification Search
CPC ............ H04N 19/00769; H04N 19/597; H04N 19/573
See application file for complete search history.

(56) References Cited

U.S. PATENT DOCUMENTS 6,807,231 B1 * 10/2004 Wiegand ................ H04N 19/51
                                                  375/240.12
8,908,766 B2 * 12/2014 Pace ..................... H04N 19/14
                                                  375/240.16
(Continued)

FOREIGN PATENT DOCUMENTS

EP      2061005 A2    5/2009
JP      10-191393     7/1998
(Continued)

OTHER PUBLICATIONS

PCT International Search Report mailed Sep. 26, 2012 in corresponding International Application No. PCT/KR2012/000553.
(Continued)

*Primary Examiner* — Dave Czekaj
*Assistant Examiner* — Tsion B Owens
(74) *Attorney, Agent, or Firm* — NSIP Law

(57) ABSTRACT

A process and apparatus for digital compression of multiview video, supplied by additional data of scene depth. The method of coding is offered, including: each frame of the multiview video sequence, encoded again, determined according to the predefined order of coding, is represented as a collection of non-overlapped blocks, such that at least one already encoded frame is detected, corresponding to the given view and designated as reference, the synthesized frames for encoded and reference frames, differing that for each non-overlapped block of pixels of the encoded frame designated as an encoded block the spatial-combined block in the synthesized frame is determined, corresponding to the encoded frame, designated as the virtual block, for which spatial position of the block of pixels is determined in the synthesized frame corresponding to a reference frame.

12 Claims, 15 Drawing Sheets

(51) Int. Cl.
  *H04N 19/597* (2014.01)
  *H04N 19/61* (2014.01)
  *H04N 19/573* (2014.01)

(56) References Cited

U.S. PATENT DOCUMENTS

| | | | | |
|---|---|---|---|---|
| 2006/0146138 A1* | 7/2006 | Xin | H04N 19/597 | 348/207.99 |
| 2006/0177123 A1* | 8/2006 | Ha | G02B 27/2264 | 382/154 |
| 2007/0109409 A1 | 5/2007 | Yea et al. | | |
| 2008/0198924 A1* | 8/2008 | Ho | H04N 19/597 | 375/240.01 |
| 2009/0016436 A1 | 1/2009 | Park et al. | | |
| 2010/0021072 A1* | 1/2010 | Shimizu | H04N 19/527 | 382/233 |
| 2010/0322311 A1* | 12/2010 | Vetro | H04N 19/597 | 375/240.12 |
| 2010/0329358 A1 | 12/2010 | Zhang et al. | | |
| 2011/0096832 A1* | 4/2011 | Zhang | G06T 7/0071 | 375/240.08 |
| 2012/0114036 A1* | 5/2012 | Po | H04N 19/50 | 375/240.12 |
| 2012/0314027 A1* | 12/2012 | Tian | H04N 7/181 | 348/43 |
| 2013/0222377 A1* | 8/2013 | Bruls | G06T 15/00 | 345/419 |

FOREIGN PATENT DOCUMENTS

| | | |
|---|---|---|
| JP | 2008-172749 | 7/2008 |
| KR | 10-2008-0015713 | 2/2008 |
| KR | 10-2008-0050952 | 6/2008 |
| KR | 10-2009-0053821 | 5/2009 |
| KR | 10-2009-0084829 | 8/2009 |
| KR | 10-2009-0101501 | 9/2009 |
| KR | 10-2010-0022065 | 2/2010 |
| KR | 10-2010-0032390 | 3/2010 |
| KR | 10-2010-0097086 | 9/2010 |
| KR | 10-2010-0125292 | 11/2010 |
| KR | 10-2011-0006696 | 1/2011 |
| WO | WO 2005/041585 A1 | 5/2005 |
| WO | WO 2009/020542 A1 | 2/2009 |
| WO | WO 2010/043773 A1 | 4/2010 |
| WO | WO 2010/095471 A1 | 8/2010 |

OTHER PUBLICATIONS

Steffen Kamp et al., "Decoder Side Motion Vector Derivation for Inter Frame Video Coding", Image Processing, 2008. ICIP 2008, 15$^{th}$ IEEE International Conference on Oct. 12-15, 2008, pp. 1120-1123.

Sven Klomp et al., "Decoder-Side Block Motion Estimation for H.264/MPEG-4 AVC Based Video Coding", Circuits and Systems, 2009. ISCAS 2009, IEEE International Symposium on May 24-27, 2009, pp. 1641-1644.

* cited by examiner

| Mode | moment of time = T | moment of time = T+1 |
|---|---|---|
| VDir |  |  |
| MVDir |  |  |

FIG. 13

APPARATUS AND METHOD FOR ADAPTIVE FRAME PREDICTION FOR MULTIVIEW VIDEO SEQUENCE CODING

CROSS-REFERENCE TO RELATED APPLICATIONS

This application is a U.S. National Phase application of International Application No. PCT/KR2012/000553 filed Jan. 20, 2012 and claims the priority benefit of Russian Federation Application No. 2011102033 filed Jan. 20, 2011 in the Russian Federation Intellectual Property Office, the contents of each of which are incorporated herein by reference.

BACKGROUND

1. Field

Example embodiments of the following disclosure relate to an area of digital signals processing, in particular, the following disclosure concerns the process of digital compression of multiview video (hereinafter "MVV"), supported by additional data of scene depth.

2. Description of the Related Art

Each view or view corresponding to a specific spatial position of the shooting camera represents a video-stream, which is completed by the information relating to a scene depth, corresponding to a specific view. Thus, the information on scene depth is represented in the form of sequence of frames, each of which stores the information on depth in an appropriate moment of time for a specific spatial position. The information on depth in a frame is normally represented similarly to the information of brightness component of pixels, i.e., with usage of gradations of grey color that sets specific accuracy of storage and is designated also by the term "the depth map".

Generally, at present, for compression of MVV, the hybrid approach is basically applied, which means that a frame belonging to a specified view or depth, in the set moment of time is represented by difference addition (rest) to already encoded frames, with the subsequent application of spatial conversion, stage of quantization, and statistical coding. Thus, at compression, the service information (the field of motion of vectors, rules of block splitting, etc.) is formed, encoded and transferred for the subsequent decoding. In a case when MVV is completed by the information on scene depth, its usage with the procedure of synthesis of views is obviously possible for creation of the additional prediction applied in hybrid processes of coding, for increasing of a degree of compression due to reduction of difference addition.

However, frequently quality of the synthesized frames appears insufficient and usage of special methods of obvious selection of a prediction by creation of lists of reference frames demands coding of the additional data. The specified reasons do not allow for achieving the essential increase of a degree of compression.

SUMMARY

Additional aspects and/or advantages will be set forth in part in the description which follows and, in part, will be apparent from the description, or may be learned by practice of the invention.

The extension of the widespread coding standard of video, H.264/MPEG-4 AVC, is known (the standard of compression of video, intended for reaching of a high degree of compression of a video stream at saving of high quality; is a modification of the earlier existing H.263, see, for example, Iain E. Richardson <<The H.264 Advanced Video Compression Standard>>, 2nd Edition, April 2010 [1]), intended for coding of multiview video which removes interframe redundancy by time and between views by an adaptive selection of reference frames with obvious coding and transmission of the service information for the subsequent decoding. However, a drawback of this method is obvious transmission of the service information, such as, motion vector, the data of relative shift of projections relative each other of the 3-dimensional scene in adjacent views, necessity of transmission of information of prediction mode, and also insufficient efficiency of usage of correlation between views. It leads to small increase in a degree of compression in comparison with independent coding of views. Various methods of an effective prediction of frame and also coding of data of motion have been offered to overcome a part of the specified drawbacks. In particular, methods of a prediction of the frame, partially removing specified drawbacks, characteristic as well for hybrid processes of coding of normal video streams are described in articles S. Kamp, M. Evertz, and M. Wien, "Decoder side motion vector derivation for inter frame video coding", in Proc. ICIP2008, October 2008, pp. 1120-1123 [2] and S. Klomp, M. Munderloh, Y. Vatis, and J. Ostermann, "Decoder-Side Block Motion Estimation for H.264/MPEG-4 AVC Based Video Coding", IEEE International Symposium on Circuits and Systems, Taipei, Taiwan, May 2009, pp. 1641-1644 [3].

The concept, similar by meaning, is offered for coding of MVV, completed by the information on scene depth, which is described in article S. Shimizu and H. Kimata, "Improved view synthesis prediction using decoder-side motion derivation for multi-view video coding", 3DTV Conference, June 2010 [4].

The method, described in [4], may include the following main steps:

Generation of the synthesized frames corresponding to the encoded frame, and adjacent with it by time, considered as a reference frame.

Application of procedure of estimation of motion for the synthesized frames and creation of the information on motion;

Application of procedure of compensation of motion for creation of prediction of an encoded frame, using the revealed earlier information on motion and reference frame.

Coding of a frame by its splitting into blocks of the fixed size, and the subsequent coding of each block or with usage of standard resources of coding according to standard H.264/MPEG-4 AVC, or it by-pixel approximation by the block, belonging to earlier generated prediction of the encoded frame, located in the same spatial position, as the encoded block.

In spite of the fact that the prediction of an encoded frame is performed precisely enough, the improvement of a degree of compression is insignificant, and achieves about 2.5% compression. Besides, the method of creation of a prediction of a frame does not include additional methods of increase of accuracy of a prediction in case the prediction from a reference frame, adjacent by time, appears ineffective. However, for an increase of efficiency of compression of MVV sequences the methods are known, such as: method based on creation of frames, spatial-combined to the encoded frame, the specified adjusting of order and method of prediction (see the laid-open US Patent Application No. 2007/0109409) [5]. For decreasing of bit expenses for coding of data of motion the number of methods of indirect recalculation of motion vectors is offered based on specified before motion vectors, or motion vectors common for both depth maps, and for views, for example, the International Patent Application Publication No. WO2010/043773 [6], and also a method of obvious usage of motion vector from already encoded view (see the International Patent Application Publication No. WO2009/020542) [7]. For increase of efficiency of a prediction of encoded frame in the MVV sequence the method of correction of the reference frame, received from one of adjacent views, is offered, at that partial compensation of distinctions between the data in encoded and reference frames is provided (see the International Patent Application Publication No. WO 2010/095471) [8]. As a whole, however, the specified methods do not allow a full removal of the informational redundancy, inherent to MVV video sequences, since these specified methods do not provide effective coding of the service information, and simultaneous creation of small prediction errors in the right degree.

Thus, the present disclosure is directed to development of an improved method, including adaptive creation of a prediction for the encoded frame, additional resources for improvement of accuracy of a prediction and the effective mechanism of compression, which should not demand essential bit expenses for transmission of service information.

Technical results are achieved due to the application of the method of encoding of the multiview video sequence, to which multiview sequence of depth maps is enclosed, consisting in that each frame of the multiview video sequence, encoded again, determined according to the predefined order of coding, is represented as a collection of non-overlapped blocks, at least one already encoded frame is detected, corresponding to the given view and designated as a reference, the synthesized frames for encoded and reference frames, differing that for each non-overlapped block of pixels of the encoded frame designated as encoded block the spatial-combined block in the synthesized frame is determined, corresponding to the encoded frame, designated as the virtual block, for which spatial position of the block of pixels is determined in the synthesized frame corresponding to a reference frame, such, that the reference virtual block, determined in such way, is the most exact numerical approximation of the virtual block; for the reference virtual block, determined in such way, the spatial-combined block is determined, belonging to a reference frame, designated as the reference block, and an error between the virtual block and the reference virtual block is computed, and also an error between the reference virtual block and the reference block is computed, then the minimum of these errors is selected and, based on it, at least, one mode of difference coding is determined, setting which of the blocks detected on the previous steps are necessary for using for creation of prediction at the subsequent difference coding of the encoded block, and difference coding of the encoded block is performed according to the selected mode of difference coding.

As it is known, redundancy of MVV is essentially higher, than redundancy of normal single-view video. Normally systems of coding of MVV, in particular, realized according to the expanded version of the coding standard H.264 and designated in the literature as MVC (Multi-View Coding), use one or several additional reference frames which are applied further for difference coding. Additional frames are formed based on already encoded views, providing synchronism of the encoder and the decoder, and allow improving accuracy of a prediction for the encoded frame. Prediction creation is normally performed by synthesis of the view, spatial combined with encoded view, at that accuracy of spatial combination of separate details of the synthesized view is determined by used algorithm of synthesis, and also accuracy of input data. More simple methods based on a block estimation of the best prediction from already encoded view without application of procedure of synthesis can be used also. These methods are based on classical procedure of temporal motion compensation (motion compensation—MC). Normally, such methods are designated in the literature as methods of disparity compensation (disparity compensation—DC). It is known also that usage of additional reference frames sometimes demands transmission of the additional service information necessary for coding of a mode of a prediction that can lead to decreasing of efficiency of compression in some cases. It is necessary to note that in some cases additional reference frames do not lead to essential increase of degree of compression, in view of insufficient similarity with an encoded frame in comparison with frames, which are selected as prediction and belong to encoded view, i.e. representing already decoded frames of encoded view.

Unlike known approaches to solution of the above-stated problems, the present disclosure allows to define modes of prediction and information of motion in a frame, and also to perform difference coding of a frame, using small size of the service information due to the registration of known spatial connections between adjacent views in each moment of time, and also the information accessible both at coding and at decoding.

An example distinctive feature of the present disclosure includes that compact representation of a current encoded frame is provided due to adaptive selection of a mode of coding and effective local decorrelation of texture, and that essential decreasing of the necessary service information is provided due to its definition based on the data, accessible simultaneously at coding and decoding. Increasing of efficiency of compression in comparison with standard systems of coding is achieved due to the decreasing of an amount of the transferred service information, and increasing of an accuracy of data coding at the expense of a larger number of modes of coding. Further, that offered approach is compatible with traditional processes of the hybrid coding applied to coding of MVV.

In the present disclosure, the improved method of coding of MVV at the cost of creation of an estimation of the best prediction of encoded frame is described. Let's assume that MVV consists from N adjacent views and N appropriate video-streams representing the information on physical scene depth (PSD) for each of the views. Let's consider also a hypothetical system of coding of MVV and its state at which at the moment time encode the view with number K, and, at least, one previous view, and also PSD corresponding to it, for example K−1 is already encoded. Let's consider the M-th frame which belongs to the K-th view, assuming that, at least, one of the previous frames, for example M−1 and probably one or more frames following on time, for example M+1, are also encoded already. Next, let's designate a frame belonging to the K-th view in the moment of time M, as F(K,M). It is meant that a considered method, including all expressions and equalities, apply to all color components of an encoded frame taking into account the real geometrical sizes of processed components. Proceeding from it, arguments and computations below are discussed with respect to one color channel, in particular the channel of brightness, and can be similarly applied to other components.

Another example of a distinctive feature of the present disclosure includes that the offered method means block processing of encoded frame F(K, M). Normally, the block has the fixed geometrical sizes, for example 16 by 16 pixels, and that dividing of frame F(K, M) on blocks is performed uniformly without overlaps or not considered areas. In the beginning, for reception of estimation of a prediction of some block B(K, M), which belongs to frame F(K, M) the synthesized block which is spatially combined (collocated) with processed block B(K, M) is formed. This synthesized block designated as VB(K, M) belongs to synthesized (virtual) view VF(K, M) which can be described as:

$$VF(K,M)=VS[F(K-1,M),F(K+1,M),D(K-1,M),D(K+1,M)]$$

where VS designates some procedure of synthesis of view, and

D(K−1, M) and D(K+1, M) represent the information on depth in a present moment of time M from view K−1 and K+1, accordingly.

Thus no additional requirements are produced to features or specificity of procedure of synthesis of VS; in particular, procedure of synthesis can use only one view for synthesis, as such, the procedure will be non-symmetric, "one-sided".

Then, the virtual frame is formed, which is previous in time to the given frame, and here designated as VF(K,M−1). For synthesized block VB(K,M), the reference virtual block is determined, designated as VB(K,M−1), and the algorithm of motion estimation is used for the determination. Reference virtual block VB(K,M−1) belongs to a virtual frame in the previous moment of time M−1 and is the best approximation of block VB(K,M) in some predefined mathematical sense, for example, in sense of a minimum of criterion SAD (Sum of Absolute Differences) or MSE (Mean Square Error). Block VB(K,M) is connected with VB(K,M−1) by so-called motion vector (dx, dy) which describes a horizontal and vertical space shift of the reference block concerning the encoded block, and is a parameter of the elementary, but not single, model of motion, applied in practice. Then, the block is determined, which is a reference for B(K,M), which belongs to frame F(K,M−1), and which is spatially combined with VB(K,M−1). Thus, the following three blocks are determined, connected with each other by the links described above: VB(K,M), VB(K,M−1), B(K,M−1). As such, only VB(K,M) is spatially aligned according to previously set grid of blocks. It should be noted that each described block, besides the number of view to which it belongs and also temporal mark M or M−1, is set by coordinates of the upper left angle, however, with a view of simplification of further description they are not used, if only it does not lead to incorrect interpretation of the description of the present disclosure.

Another example of a distinctive feature of the present disclosure includes that at least two modes of prediction for current encoded block B(K,M), conditionally designated as Temporal and Parallax modes of prediction, are determined. To estimate a mode of prediction of block B(K,M), an optimal mode of a prediction for VB (K, M−1) is estimated:

Temporal mode of prediction, in which VB(K,M−1) is predicted from VB(K,M), and

Parallax mode of prediction, in which VB(K,M−1) is predicted from B(K,M−1).

The optimum mode of prediction of block VB(K,M−1) is based on the computation and the analysis of a prediction error from VB(K,M) or B(K,M−1). In such a case, if the prediction error with usage of VB(K,M) is minimal, the temporal mode of a prediction is set. Otherwise, parallax mode of prediction is set. Next, the optimum predictor for block B(K,M) may be determined, according to the following rule:

VB(K,M) is used as the optimum predictor if parallax mode is set; and

B(K, M−1) is used as the optimum predictor if the temporal mode is set.

The choice of the optimum mode is based on the assumption that in many cases the mode of a prediction of block VB(K,M) may be sharply determined, proceeding from the mode of prediction of block VB(K,M−1). In this case, transmission of additional bits is not required for the obvious set of a mode of prediction. Thus, the essential increase of efficiency of compression is achieved due to the determination of parameters of motion, a mode of prediction for the encoded block without obvious transmission of the service information, and an increase of accuracy of a prediction of the encoded block.

Another distinctive feature of the present disclosure may include that the mode of coding of block B(K,M) is determined obviously, and that the measure of prediction error is computed in temporal and parallax mode, and a mode that provides the minimum error is selected. Thus, predictors may be selected according to specific mode and the rules described above. The mode of a prediction of block VB(K, M−1) is used to reduce the number of additional bits necessary for obvious coding and transmission of a mode of a prediction. One of methods may be that the mode of prediction of block VB(K,M−1) is used as the additional contextual information for statistical coding of obviously determined mode of a prediction. Another method may consist of forced change of obviously determined mode of a prediction on a mode defined for block VB(K,M−1) if the measure of prediction error varies on the value, smaller, than the predefined threshold value.

Another distinctive feature of the present disclosure including that the additional mode of coding is offered, which is based on a prediction of differences between encoded block B(K, M) and block VB(K,M), with which it is spatially-combined. Thus, creation of prediction may be based on the assumption that:

$$VB(K,M-1)-RB(K,M-1)\cong VB(K,M)-B(K,M)$$

Therefore, predictor PB(K,M) of block B(K,M) may be computed as follows:

$$PB(K,M)=VB(K,M)-VB(K,M-1)+B(K,M-1)$$

The specified additional mode of prediction may provide more exact prediction of blocks when the modes of a prediction, considered earlier, appear ineffective.

For usage of an additional mode of prediction, it may be necessary to obviously transfer the service information about the selected mode. However, results of experiments specify that redundancy and amount of the additional service information is unessential. As a whole, the method of the coding based on the offered method of an adaptive prediction of frame, provides effective decorrelation of an encoded frame with insignificant additional bit expenses that is proved by increase of compression ratio of MVV. The present disclosure is technological compatible to traditional coding systems of MVV, and may be integrated into a standard chain of coding.

BRIEF DESCRIPTION OF THE DRAWINGS

These and/or other aspects and advantages will become apparent and more readily appreciated from the following description of the embodiments, taken in conjunction with the accompanying drawings of which:

FIG. 4, view 3.2—The hybrid process of coding and decoding of MVV sequence which is based on the MVC encoder and decoder and uses the additional frames, partially formed by procedure of synthesis of a frame, according to an example embodiment.

FIG. 5, view 4.2—The process of double-sided (symmetric) synthesis of a frame, according to an example embodiment.

FIG. 13.—The visualized maps of modes for modes Dir, MDir and MDir+ΔΔ, according to an example embodiment.

DETAILED DESCRIPTION

Figure 1:
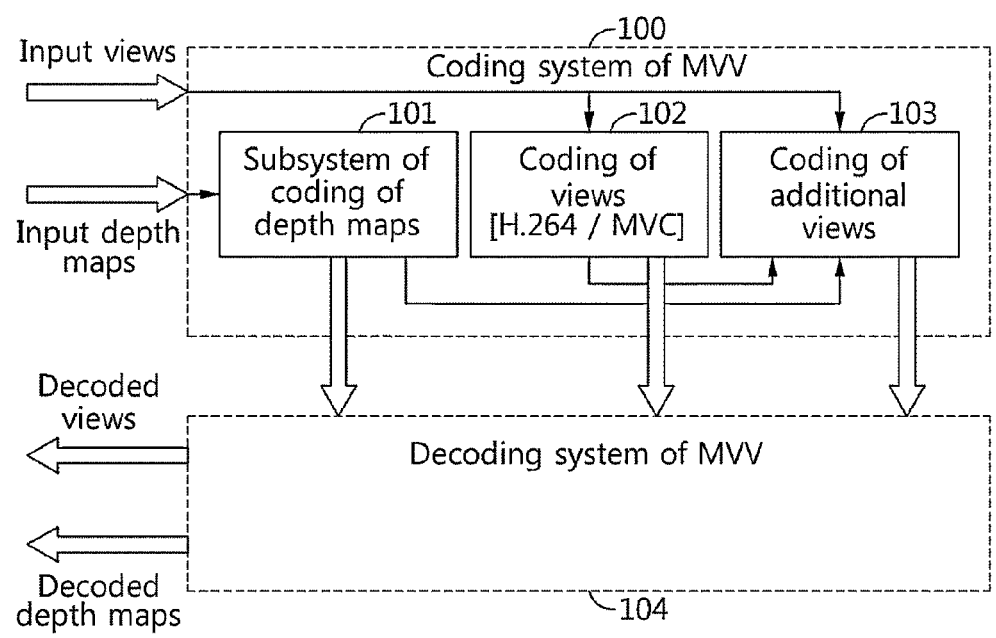
FIG. 1.—The block diagram of encoding and decoding of MVV sequence which forms MVC—compatible bit stream, according to an example embodiment.

Reference will now be made in detail to the embodiments, examples of which are illustrated in the accompanying drawings, wherein like reference numerals refer to the like elements throughout. The embodiments are described below to explain the present invention by referring to the figures.

It is clear from the aforesaid that the present disclosure relates to coding and decoding of MVV, for example, elimination of the correlative links existing between frames by means of an adaptive prediction. As it follows from FIG. 1, the multitude of the adjacent views (video sequences), received by means of multi camera system, and also sequences of maps of depths corresponding to these views are submitted on an input of coding system 100. Generally, a coding system includes a subsystem 101 of coding of sequences of maps of depths and a subsystem of coding of video sequences (views) which are formed by blocks 102 and 103, thus, the block 102 may provide coding of video sequences according to standard H.264/MPEG-4 AVC (compatible views), and the block 103 may provide coding of additional video sequences (additional views). The present disclosure may be applied during the implementation of a subsystem of coding of additional views.

Figure 2:
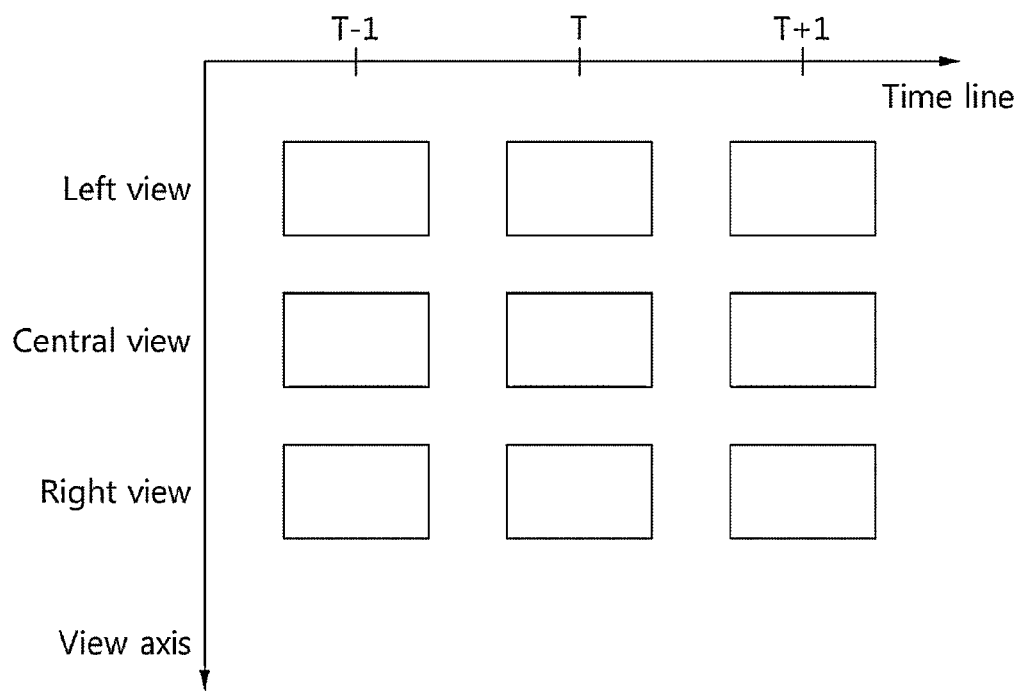
FIG. 2, view 2.1—The example of allocation of frames in the space set by a time line and number of view, according to an example embodiment.
Figure 3:
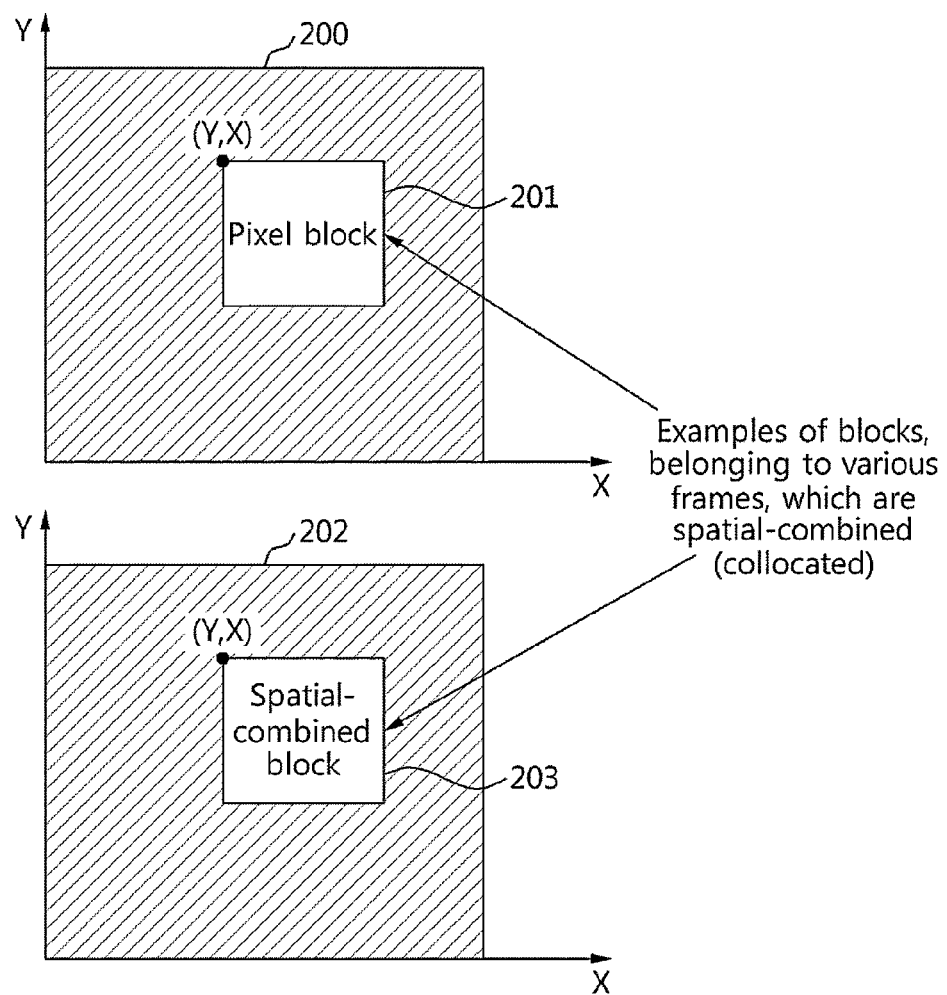
FIG. 3, view 2.2—The example of the spatial-combined blocks in two frames, according to an example embodiment.

Frames of all encoded video sequences may be classified according to relative time of their obtaining (FIG. 2, view 2.1). For simplification of the further description we will enter several definitions. A principle of space combination (collocation) (FIG. 3, view 2.2), applied in the present disclosure, consists in the following.

If some block 201 belonging to the FRAME 1 (200), has coordinates (y, x) in relation to the upper left angle of the FRAME 1, then spatially-combined block 203 of FRAMES 2 (202), will have the same coordinates (y, x) in relation to the upper left angle of the FRAME 2 (202).

Figure 4:
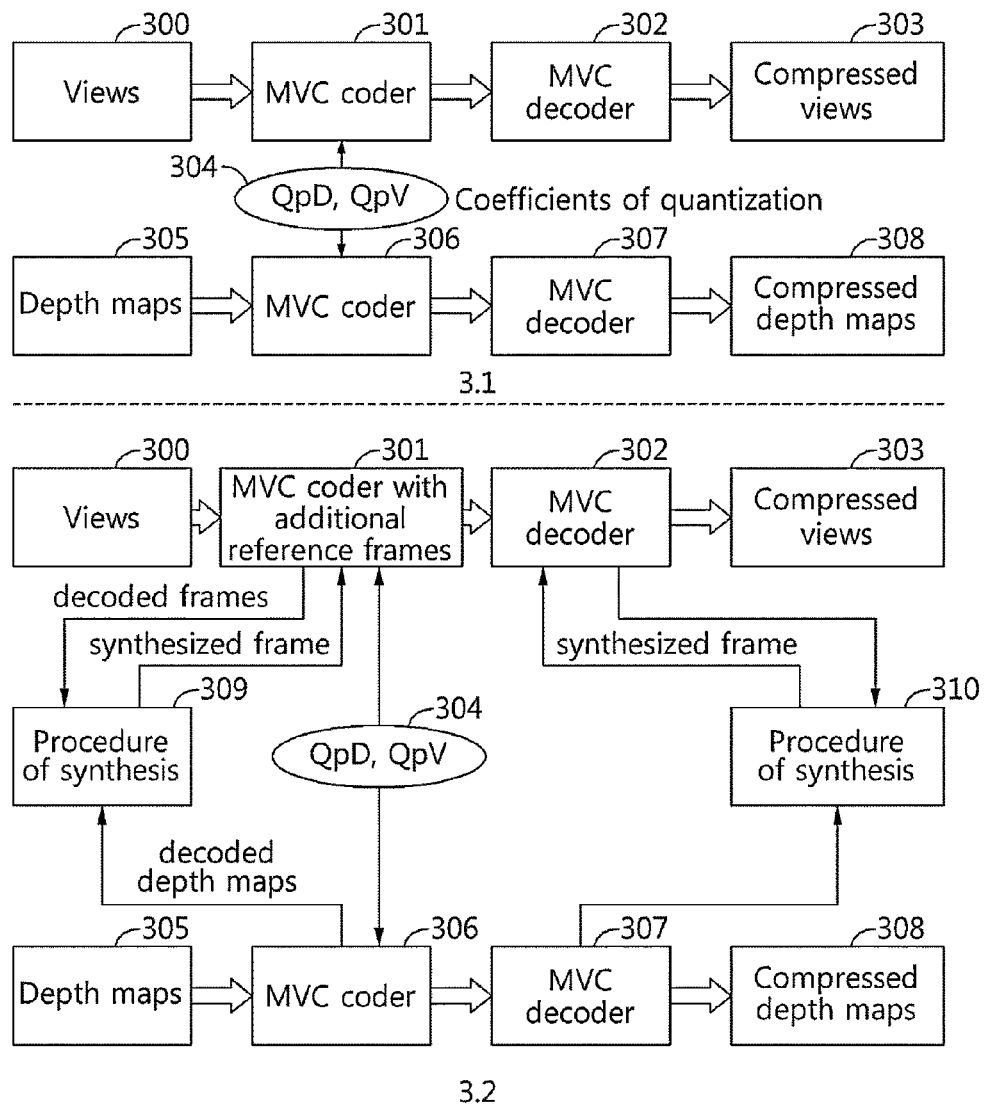
FIG. 4, view 3.1—The process of coding and decoding of MVV sequence with independent coding of views and information of depths with usage of the MVC encoder and the decoder, according to an example embodiment.

FIG. 4 shows the process of independent coding of video sequences and sequences of maps of depths. During their coding the common parameters are initial values of coefficients of quantization QpD and QpV (304) which choice influences on reached quality and compression degree. Thus parameter QpV designates the coefficient of quantization used by encoder of MVV according to standard ITU-T H264, annex H for coding of views. Parameter QpD designates the coefficient of quantization used by encoder of MVV according to standard ITU-T H264, annex H for coding of maps of depths.

Figure 5:
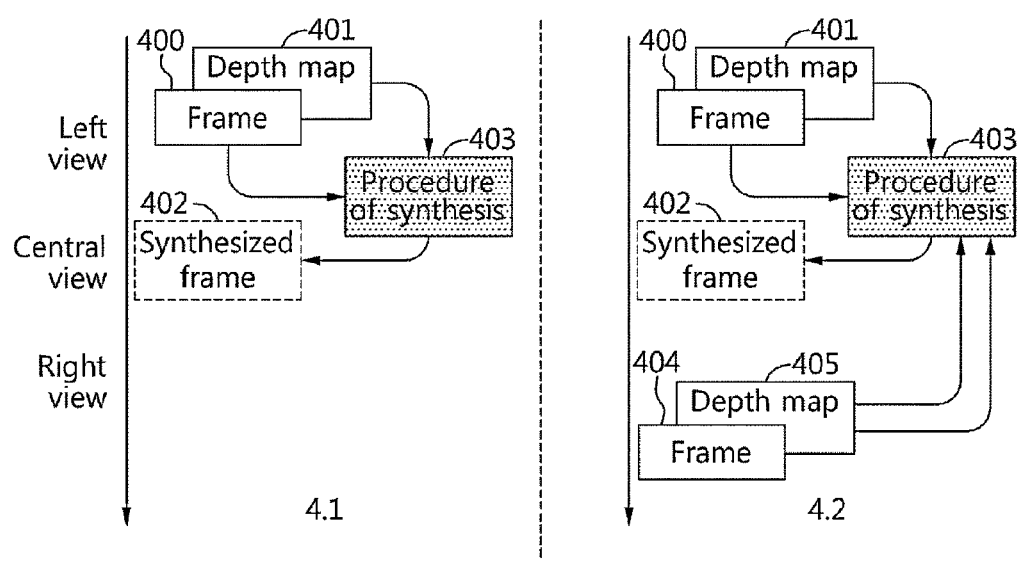
FIG. 5, view 4.1—The process of one-sided synthesis of a frame, according to an example embodiment.
Figure 6:
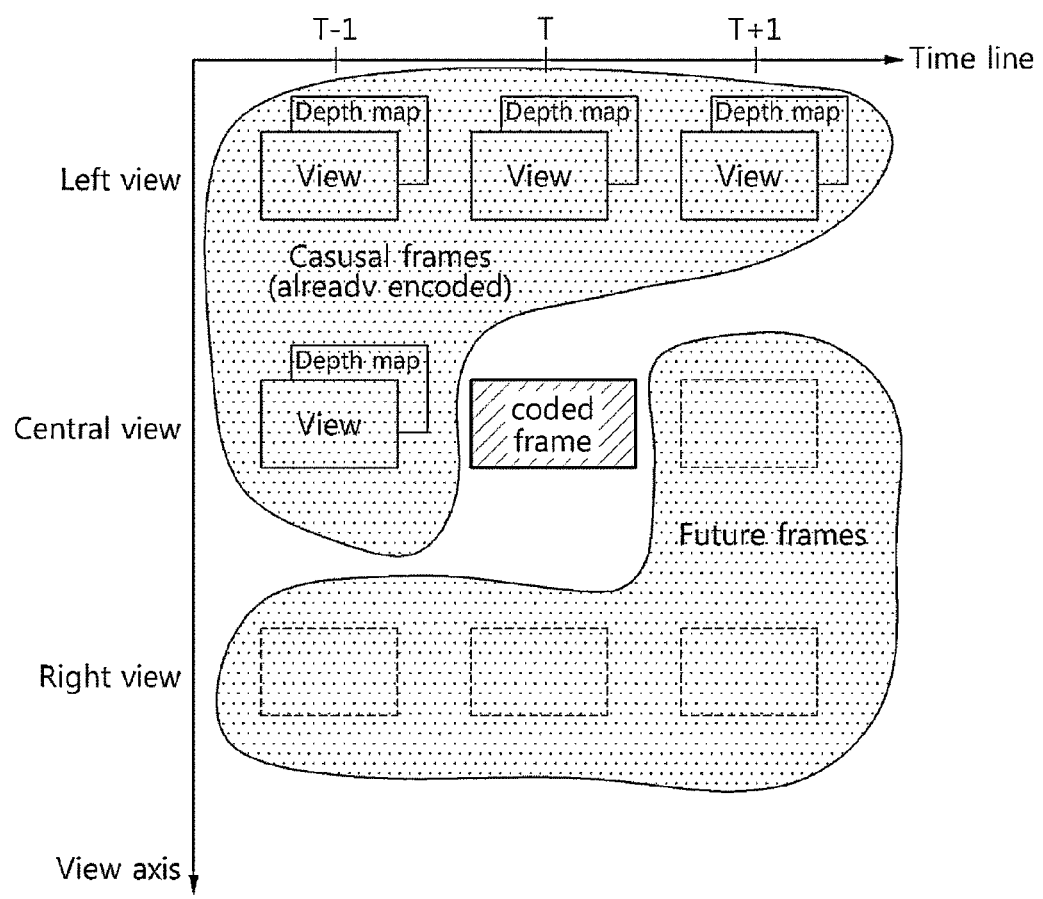
FIG. 6.—Classification of frames and maps of depths according to order of their coding, according to an example embodiment.

The more complex coding process includes construction of additional reference frames by application of procedure of synthesis of frames (309, 310). Additional reference frames are included in lists of reference frames. The order of a choice of reference frames from the list is set at coding and in case of its change is evidently transferred together with the encoded data for the subsequent decoding. The procedure of synthesis of frames is used to achieve increase of efficiency of coding by construction of a reference frame. Generally, procedures of one-sided (FIG. 5, view 4.1) and double-sided (symmetric) synthesis of a frame (FIG. 5, view 4.2) are distinguished. In the case of one-sided synthesis the frame 400 is used and the map 401 of depth corresponding to it, which belong to one video sequence. It corresponds to usage of the causal data (i.e. the data which have been encoded and decoded already) during the performance of synthesis. At double-sided synthesis the information from frames 400 and 404, and also maps 401 and 405 of depth, belonging to two adjacent views in relation to encoded view is used. Classification of frames and maps of depths according to order of their coding is presented on FIG. 6.

It should be noted that the questions connected to a method of performance of procedure of synthesis, and also accuracy of its results, are beyond the present disclosure. Nevertheless, the structure of input video sequences and sequences of maps of depths, and also number of the synthesized frames is necessary for taking into consideration at implementation of the present disclosure.

Figure 7:
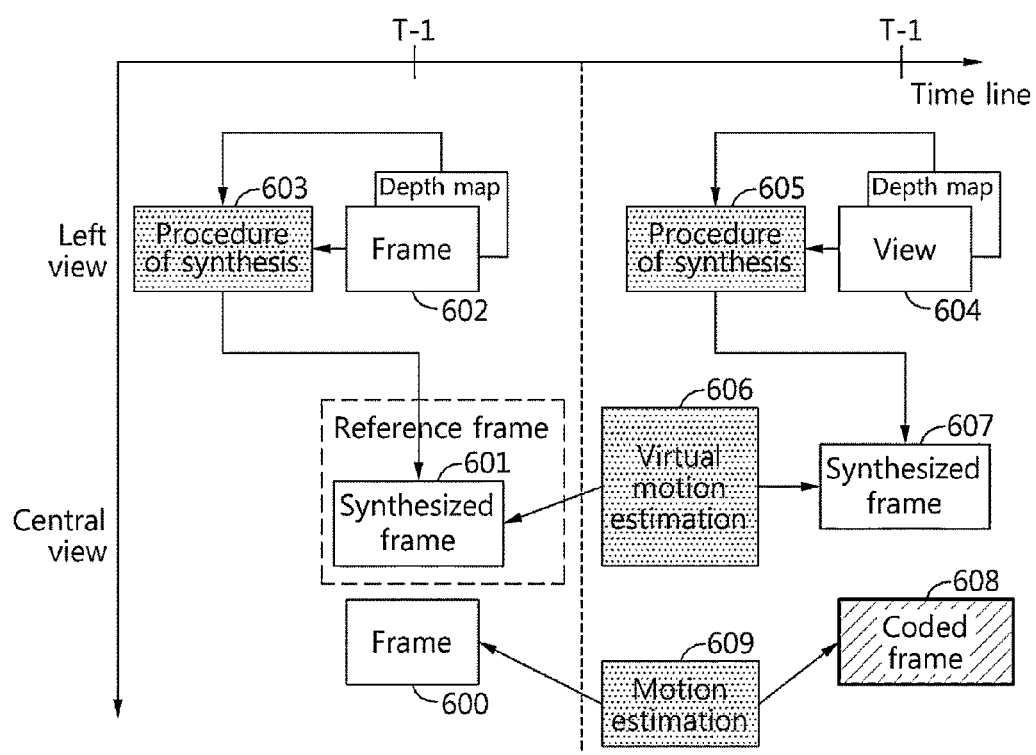
FIG. 7.—The generalized process of creation of an adaptive prediction of a frame and determination of the necessary service information, according to an example embodiment.

For more detailed analysis of the present disclosure we will consider a hypothetical system of coding of frames (FIG. 7). Let's assume that there is already an encoded frame 600 by the specified moment of time T. Let's designate current encoded frame 608 as F(Center, T). Let's designate the encoded frame, concerning to the moment of time T−1, as F(Center, T−1). Let's assume that frames 602 and 604 in moments of time T−1 and T, which belong to the left (adjacent in relation to current) video sequence, are also already encoded. Then the synthesized frames 601 and 607 are constructed for moments of time T and T−1, belonging to current (central) video sequence. Let's designate the synthesized frames 601 and 607 as VF(Center, T−1) and VF(Center, T) accordingly. It is necessary to note that the synthesized frames and frames F(Center, T−1) and F(Center, T) are spatially-combined. At the same time, the synthesized frames contain occlusions, and also the errors connected to procedure of synthesis, distinction in illumination of the scene from various sides, etc. Nevertheless, it is followed from the analysis of efficiency of procedure of synthesis of frames [4], that the synthesized frames can contain the geometrical details, specific for the displayed scene with sufficient accuracy.

Let's present a current encoded frame as set of blocks of the fixed size bl_h, bl_w:

$$F(\text{Center}, T) = \bigcup_{\substack{y=bl\_h \times N \\ x=bl\_w \times M \\ N=0 \ldots \left[\frac{H}{bl\_h}\right] \\ M=0 \ldots \left[\frac{W}{bl\_w}\right]}} B(\text{Center}, T, y, x)$$

The synthesized frame VF(Center, T) may also be presented as the set of blocks, each of which is spatially-combined with block from frame F(Center, T):

$$VF(\text{Center}, T) = \bigcup_{\substack{y=bl\_h \times N \\ x=bl\_w \times M \\ N=0 \ldots \left[\frac{H}{bl\_h}\right] \\ M=0 \ldots \left[\frac{W}{bl\_w}\right]}} VB(\text{Center}, T, y, x)$$

For each block belonging to the synthesized frame for the moment of time T, the prediction on the synthesized frame 601 is constructed (formed) for the moment of time T−1 by using this or that method of motion estimation. It should be noted that it doesn't matter which of methods of motion estimation is used for prediction search. Connection detection between the block in a frame 607 and certain reference block in a frame 601 is important. Frames 601 and 607 are accessible at decoding, which avoids coding of the additional information for synchronization of processes of coding and decoding. The reference block, which is determined during motion estimation, belongs to synthesized frame VF(Center, T−1) and has spatially-combined block in frame F(Center, T−1). Thus, there are three blocks which may be constructed both during coding and during decoding.

Figure 8:
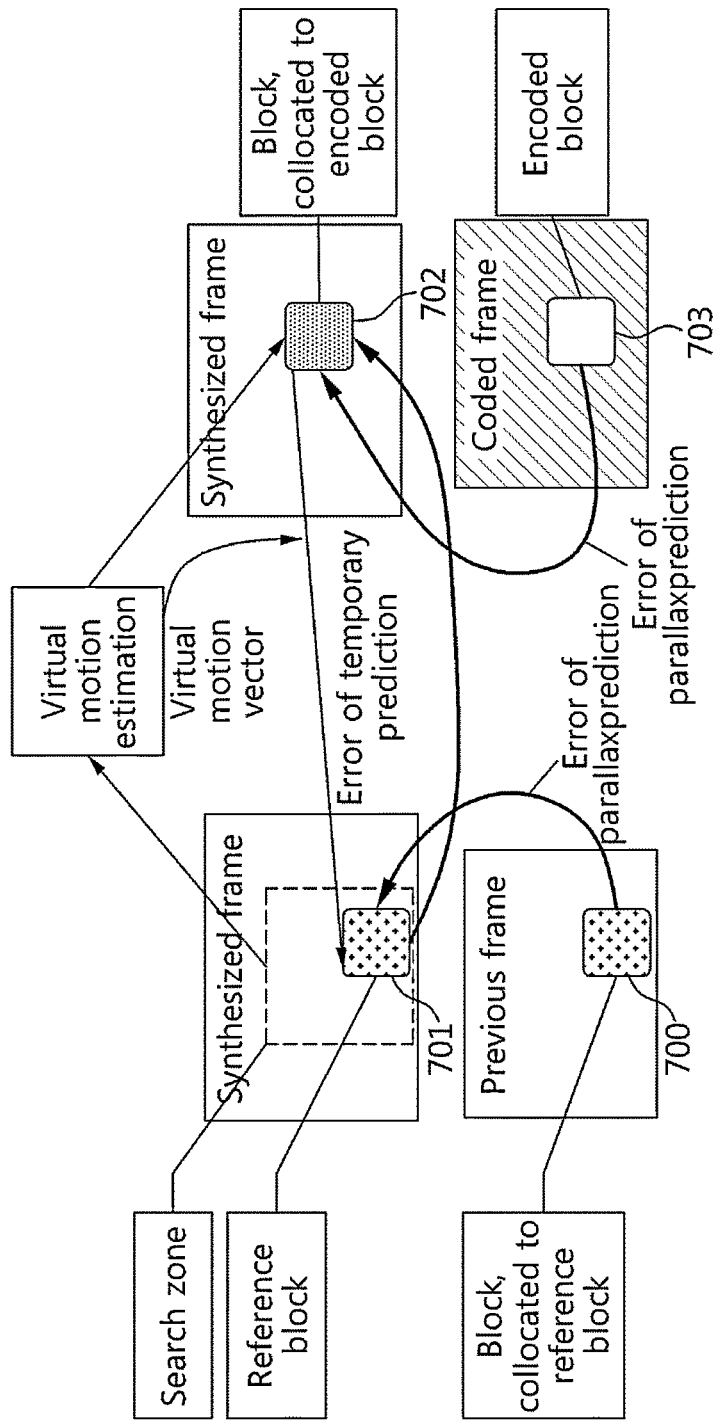
FIG. 8.—The generalized process of creation of an adaptive prediction and determination of the necessary service information for the specified encoded block, according to an example embodiment.

FIG. 8 shows the current encoded block 703, which we will designate B(Center, T, y, x). Let's designate spatially-combined block 702, belonging to frame VF(Center, T), as VB(Center, T, y, x). Result of application of a method of motion estimation is the block 701 which belongs to the synthesized frame for moment of time T−1 and which is designated as VB(Center, T−1, y+dy, x+dx). Here (dy, dx) defines, so-called, virtual motion vector. Generally, during performance of the specified operations any of motion models is applicable, for example, an affine model. Let's consider a transmitting model for simplicity of description.

The reference block 701 has the spatially-combined block 700 in frame F(Center, T−1). This block is the normal predictor and is designated as B(Center, T−1, y+dy, x+dx).

The first step of the present disclosure includes a determination of the best mode of a prediction for the block 703. In the traditional approach, two possibilities of selection of the predictor are available, by time line or by axis of views.

In case of a prediction by time line the coding of differences (rests) is made, using the following:

$$\Delta T(y, x)_{i,j} = \\ \substack{i \in 0 \ldots bl\_h \\ j \in 0 \ldots bl\_w} \\ B(\text{Center}, T, y+i, x+j) - B(\text{Center}, T-1, y+dy+i, x+dx+j)$$

In case of a prediction by parallax axis, differences (rests) are exposed coding, using the following:

$$\Delta P(y, x)_{i,j} = B(\text{Center}, T, y+i, x+j) - VB(\text{Center}, T, y+i, x+j) \\ \substack{i \in 0 \ldots bl\_h \\ j \in 0 \ldots bl\_w}$$

During the research that has been conducted, it has been determined that the mode of a prediction, which provides minimum of the metrics of differences (rests), may be selected based on the analysis of "additional" differences (rests).

Let's compute virtual differences by time axis and axis of views, according to the following expressions:

$$\Delta VT(y, x)_{i,j} = \\ \substack{i \in 0 \ldots bl\_h \\ j \in 0 \ldots bl\_w} \\ VB(\text{Center}, T, y+i, x+j) - VB(\text{Center}, T-1, y+dy+i, x+dx+j)$$

and $$\Delta VP(y, x)_{i,j} = B(\text{Center}, T-1, y+dy+i, x+dx+j) - \\ \substack{i \in 0 \ldots bl\_h \\ j \in 0 \ldots bl\_w} \\ VB(\text{Center}, T-1, y+dy+i, x+dx+j)$$

Then, let's compute measures of the received virtual differences (rests). Any suitable measure can be selected as a digital measure. In described implementation of the present disclosure the sum of absolute differences is used, which provides necessary balance between efficiency of received estimation and complexity of its computation.

$$\text{SAD\_VT}(y, x) = \sum_{\substack{i=0 \ldots bl\_h \\ j=0 \ldots bl\_w}} |\Delta VT(y, x)_{i,j}|,$$

$$\text{SAD\_VP}(y, x) = \sum_{\substack{i=0 \ldots bl\_h \\ j=0 \ldots bl\_w}} |\Delta VP(y, x)_{i,j}|.$$

Let's obtain estimation for virtual mode of prediction for block VB(Center, T−1, y+dy, x+dx) to determine a mode of a prediction for block B (Center, T, y, x). Let's compare SAD_VT(y,x) and SAD_VP(y,x) for this purpose:

$$VDir(y, x) = \begin{cases} \text{Temporal, } SAD\_VT(y, x) < SAD\_VP(y, x) \\ \text{Parallax, } SAD\_VP(y, x) \leq SAD\_VT(y, x). \end{cases}$$

Here, the mode of prediction, designated as <<Temporal>>, means that block VB(Center, T−1, y+dy, x+dx) is predicted using the block VB(Center, T, y, x). As a result block B(Center, T, y, x) should be predicted using the reference block B(Center, T−1, y+dy, x+dx). The mode of prediction, designated as <<Parallax>>, means that block VB(Center, T−1, y+dy, x+dx) is predicted using the block VB(Center, T, y, x), and block B(Center, T, y, x) should be predicted using the reference block VB(Center, T, y, x). <<VDir>> designates the mode of the prediction, detected by synthesized frames and already encoded frames of video sequence. It should be noted that (dy, dx) represents a motion vector, which is determined using the synthesized frames.

It may follow from this fact, that:

obvious transmission of additional information for subsequent decoding is not required for motion estimation;

accuracy of a received motion estimation appears in general case lower, than in the case of traditional application of methods of motion estimation;

it may be necessary to perform motion estimation during decoding, which demands application of the specialized methods, capable of reducing computing complexity of process of decoding.

The obtained difference (rest) is determined as:

$$\Delta RB(y, x, Dir) = \begin{cases} \Delta T(y, x)_{i,j}, Dir = \text{Temporal} \\ \quad i=0 \ldots bl\_h \\ \quad j=0 \ldots bl\_w \\ \Delta P(y, x)_{i,j}, Dir = \text{Parallax} \\ \quad i=0 \ldots bl\_h \\ \quad j=0 \ldots bl\_w \end{cases}$$

As it is followed from the above mentioned description, there is no need in obvious transmission of additional data for determination of mode of prediction, as selection of mode is made based on the frames accessible both at coding and at decoding.

Figure 9:
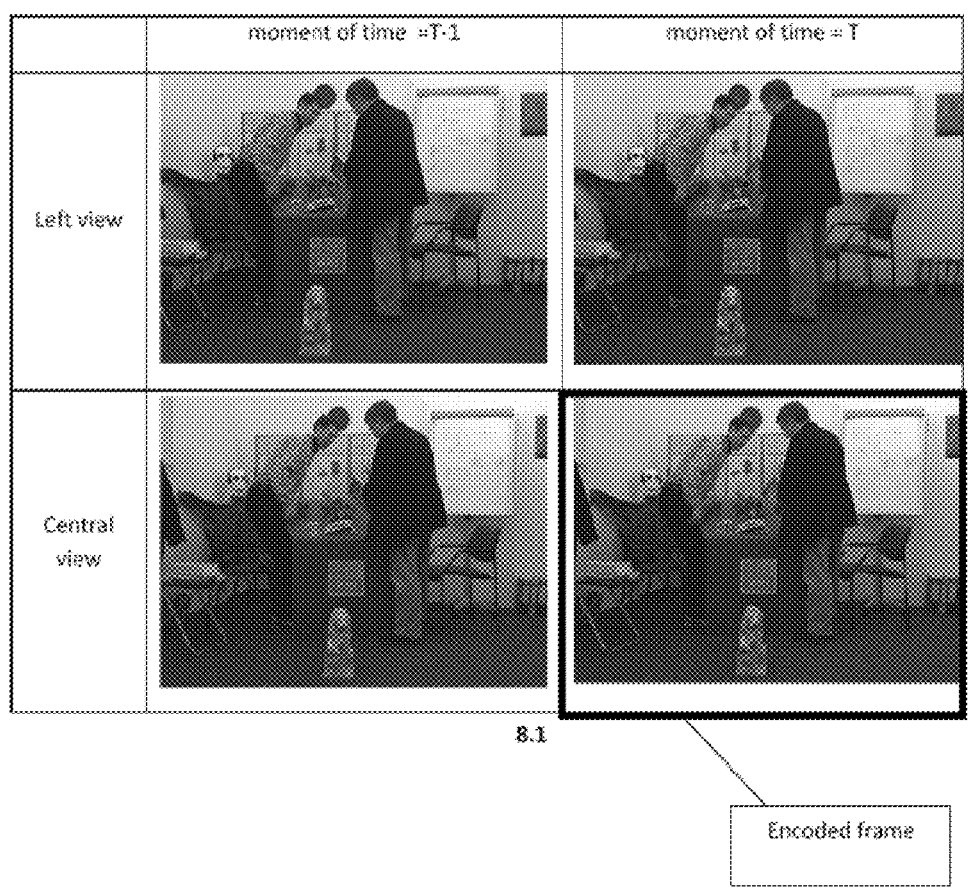
FIG. 9, view 8.1—The example of frames from two adjacent views of test MVV sequence, according to an example embodiment.
Figure 10:
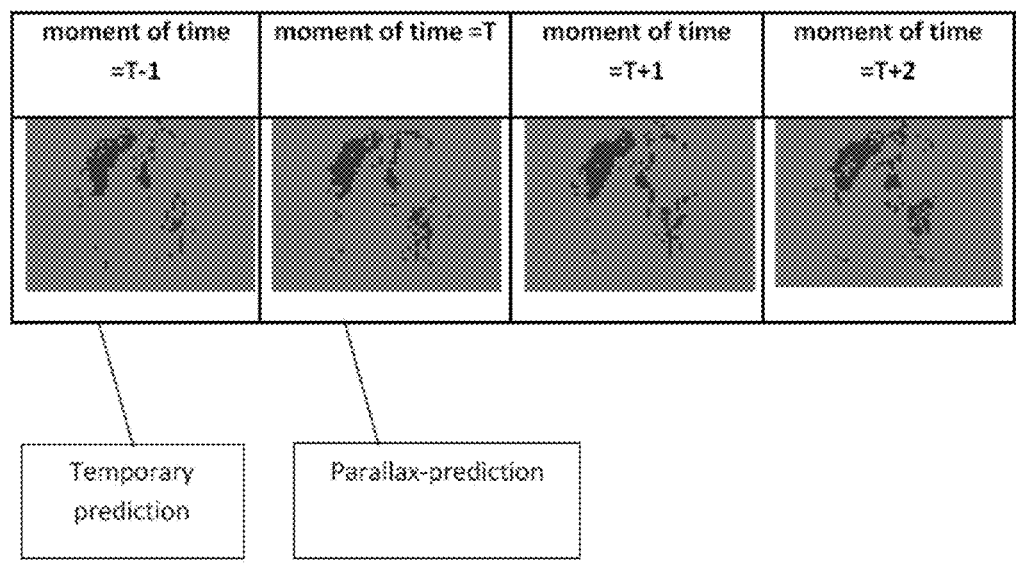
FIG. 10, view 8.2—The visualized map of modes of a prediction in moments of time T−1, T, T+1 and T+2 for encoded view, according to an example embodiment.

In the general case, the sizes of blocks, used for motion estimation using the synthesized frames, and the sizes of the blocks used for adaptive prediction may not coincide with each other. For example, the motion estimation can be made for blocks of 16×16 pixels while the adaptive prediction can be performed for blocks 8×8. Referring to FIG. 9, view 8.1, frames for two video sequences, which are part of MVV <<BookArrival>>, are presented. MVV <<BookArrival>> is a part of a set of test MVV, recommended by MPEG (see "Description of Exploration Experiments in 3D Video Coding", MPEG2010/N11630 Guangzhou, China October 2010) [9]. Examples of maps of modes of prediction are shown on FIG. 10, view 8.2. For illustration, selected modes of prediction (by time axis or axis of views) are represented as blocks of appropriate tone of grey color.

For the purpose of further increasing efficiency of prediction, it is offered to use obvious selection of the best mode of prediction in present disclosure, which is specified using mode of prediction VDir, defined above, for more compact further coding. At that, following steps are performed:

computation of the metrics for the differences (rests) received by obvious prediction by time axis ΔT and axis of views ΔP:

$$SAD\_T(y, x) = \sum_{\substack{i=0 \ldots bl\_h \\ j=0 \ldots bl\_w}} |\Delta T(y, x)_{i,j}|,$$

$$SAD\_P(y, x) = \sum_{\substack{i=0 \ldots bl\_h \\ j=0 \ldots bl\_w}} |\Delta P(y, x)_{i,j}|.$$

The mode of prediction based on value VDir was obviously determined based on obtained estimations. The method of estimation of efficiency of selection of prediction consists in a forced choice of mode VDir instead of mode Dir, determined evidently, in case the prediction error is in the set range, defined by some threshold value. The mode of a prediction in case of its obvious determination is set by the following expression:

$$Dir = \begin{cases} \text{Temporal, } SAD\_T(y, x) < SAD\_P(y, x) \\ \text{Parallax, } SAD\_P(y, x) \leq SAD\_T(y, x) \end{cases}$$

Then the modified choice rule of a mode of prediction of MDir can be defined as, the following:

$$MDir(y, x, VDir) = \begin{cases} \text{Parallax, } (Dir = \text{Temporal}) \wedge (VDir = \text{Parallax}) \wedge \\ |SAD\_T(y, x) - \Delta RB(y, x, VDir)| < TH \\ \text{Temporal, } (Dir = \text{Temporal}) \wedge (VDir = \text{Parallax}) \wedge \\ |SAD\_T(y, x) - \Delta RB(y, x, VDir)| \geq TH \\ \text{Parallax, } (Dir = \text{Parallax}) \wedge (VDir = \text{Parallax}) \\ \text{Temporal, } (Dir = \text{Parallax}) \wedge (VDir = \text{Temporal}) \wedge \\ |SAD\_P(y, x) - \Delta RB(y, x, VDir)| < TH \\ \text{Parallax, } (Dir = \text{Parallax}) \wedge (VDir = \text{Temporal}) \wedge \\ |SAD\_P(y, x) - \Delta RB(y, x, VDir)| \geq TH \\ \text{Temporal, } (Dir = \text{Temporal}) \wedge (VDir = \text{Temporal}) \end{cases}$$

Figure 11:
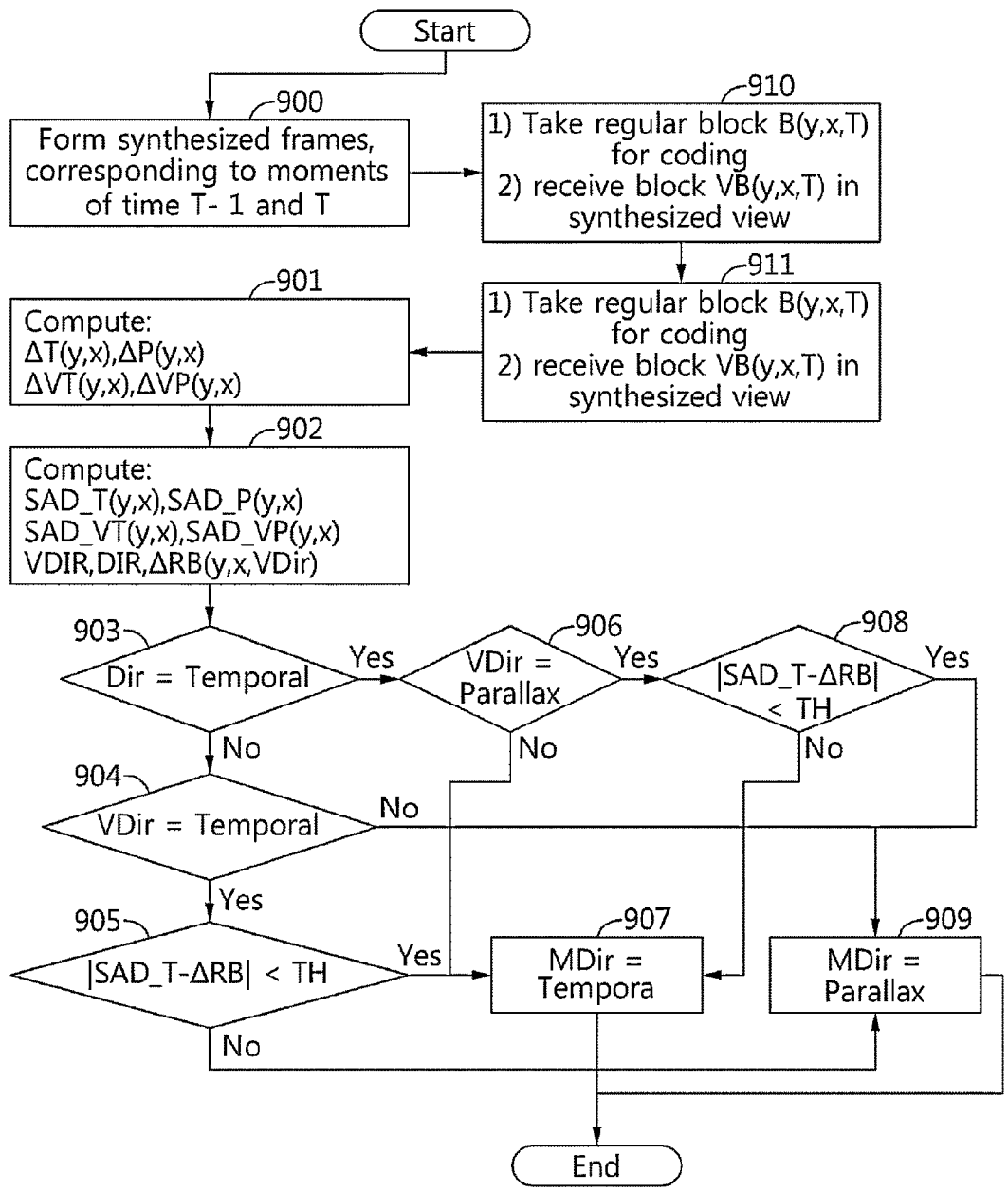
FIG. 11. The block-process of a method of definition of the modified mode of prediction, according to an example embodiment.
Figure 12:
FIG. 12.—The visualized maps of modes for modes Dir and MDir, according to an example embodiment.
Figure 12:
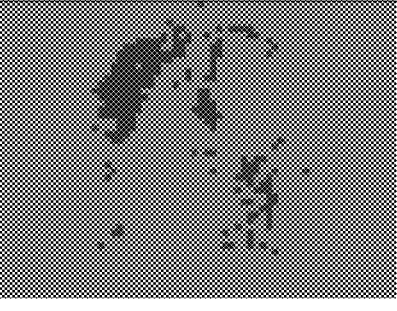
Figure 12:
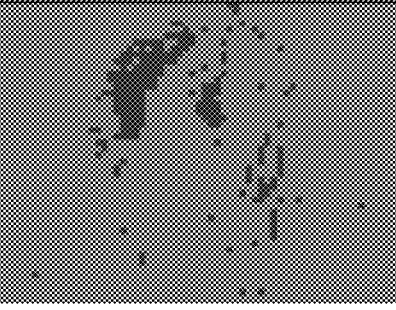
Figure 12:
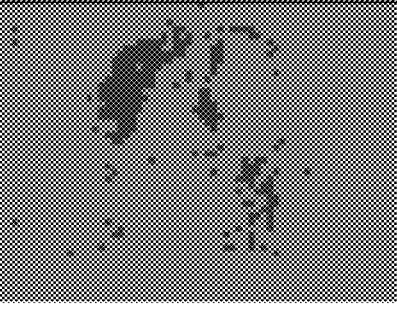

Here, VDir represents the mode of the prediction selected with usage of synthesized frames as it is described above; TH represents the set value of a threshold value, defining conditions of change of a mode of coding Dir. The method of change of a mode of the prediction defined evidently using the value VDir is shown on FIG. 11. Examples of maps of modes of the prediction received according to expressions mentioned above for VDir (y, x) and MDir (y, x, VDir), are shown on FIG. 12. In a described case threshold, value TH was set as (bl_h×bl_w)×2, where (bl_h× bl_w) represents the number of pixels in the block.

The method described above gives the mechanism of creation of an adaptive prediction for the separate block based on dependences and characteristics for MVV. It is supposed that the prediction is formed by selection of one of two possible alternatives: prediction by time axis or prediction by axis of views.

Besides the two alternatives of the prediction mentioned above, the present disclosure offers additional method of representation of values of pixels belonging to the encoded block. This method is based on a prediction of values of differences (rests), ΔP, defined for axis of views, by already computed values, ΔVP. In the elementary case it is supposed that $$\Delta P(y,x)_{\substack{i,j \\ i \in 0 \ldots bl\_h \\ j \in 0 \ldots bl\_w}} = f\left(\Delta VP(y,x)_{\substack{i,j \\ i \in 0 \ldots bl\_h \\ j \in 0 \ldots bl\_w}}\right)$$

$$= \Delta VP(y,x)_{\substack{i,j \\ i \in 0 \ldots bl\_h \\ j \in 0 \ldots bl\_w}} + \Delta\Delta(y,x)_{\substack{i,j \\ i \in 0 \ldots bl\_h \\ j \in 0 \ldots bl\_w}},$$

where $\Delta\Delta$ designates a so-called difference (rest) of the second order. If changes by time axis are approximately similar for the encoded and synthesized frames and procedure of synthesis of frames is quasi-stationary, it is possible to assume that $\Delta\Delta$ may represent certain blocks compactly enough. Thus, such representation of a frame for certain blocks appears more effective from the point of view of the reached degree of compression. The value $$\Delta\Delta(y,x)_{\substack{i,j \\ i \in 0 \ldots bl\_h \\ j \in 0 \ldots bl\_w}}$$

may be presented as:

$$\Delta\Delta_{\substack{i,j \\ i \in 0 \ldots bl\_h \\ j \in 0 \ldots bl\_w}} = B(Center, T, y, x) - P_{\Delta\Delta}(Center, T, y, x)$$

Therefore:

$$P_{\Delta\Delta}(Center,T,y,x) = VB(Center,T,y,x) + B(center,T-1,y+dy,x+dx) - VB(center,T-1,y+dy,x+dx)$$

Figure 13:
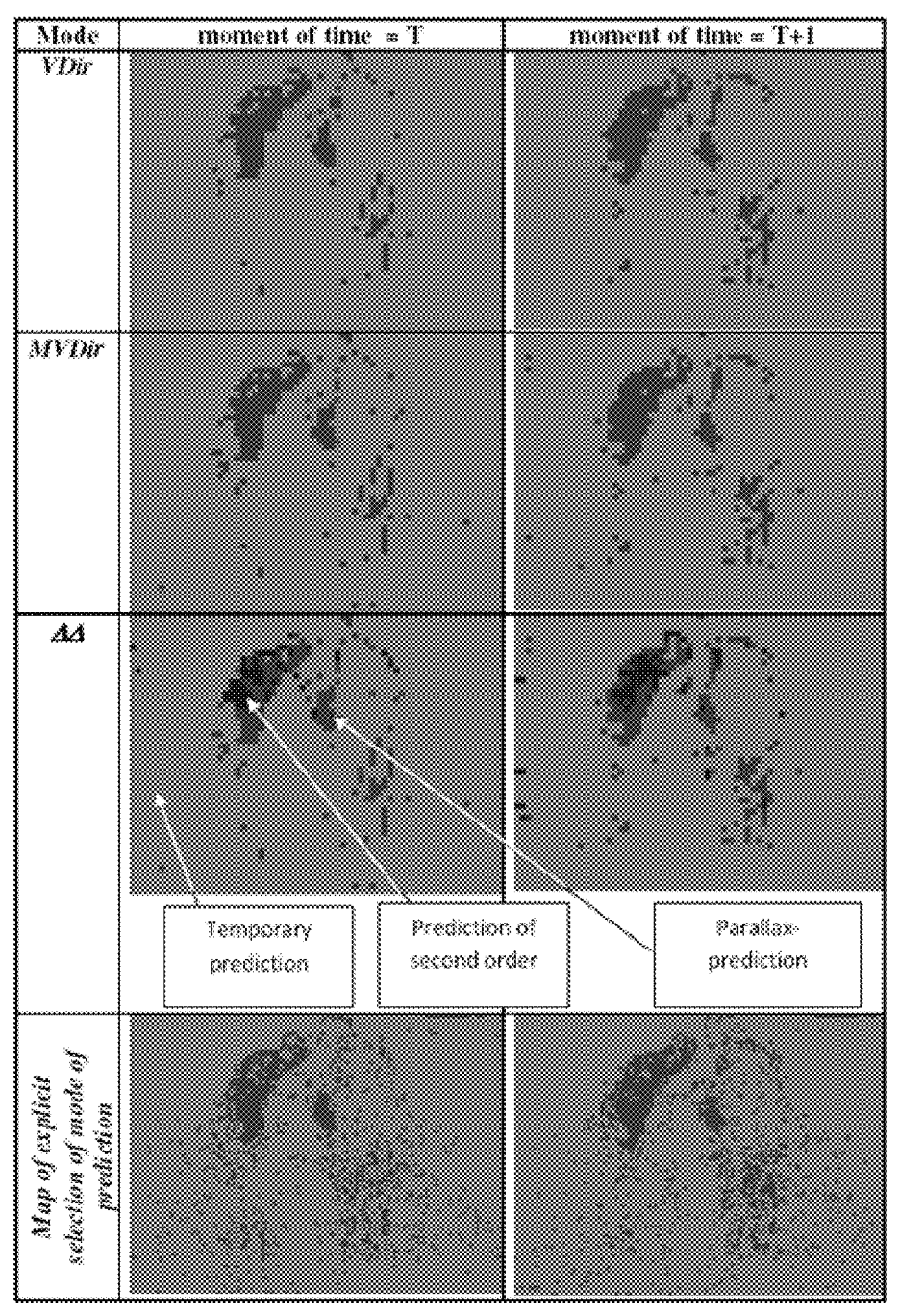

The present disclosure of a prediction may also be used for additional decorrelation of an encoded frame. In this case, the additional information on the selected mode of a prediction should be encoded and be transferred for each block. Nevertheless, results of experiments show that, in this case, the selected modes of a prediction appear correlated and can be effectively encoded by the entropy encoder with usage of appropriate contextual models. Examples of maps of modes of a prediction in the case of usage of three modes of a prediction are represented on FIG. 13.

Estimations of quality for the decoded frames have been obtained to obtain a numerical estimation of efficiency of present disclosure of adaptive decorrelation of a frame. For quality estimation, the measure of the ratio of a signal to noise PSNR (peak-to-peak signal-to-noise ratio) was used. In particular, frame pixels, except occlusions, have been encoded and decoded by the offered method, and then their quality is determined in decibels. Besides, estimations of quality for cases of usage of a prediction by time axis, predictions only for the synthesized frames, and direct combination of prediction by time axis and axis of views have been obtained. It should be emphasized that quality of frames and maps of the depths, belonging to a left (in relation to current) video sequence, directly influences quality of a prediction that is also necessary to take into consideration during the analysis. The motion estimation was performed using the traditional method described in B. Furht, J. Greenberg, R. Westwater <<Motion Estimation Algorithms for Video Compression>>, Massachusetts: Kluwer Academic Publishers, 1997, pp 64-65 [10] of exhaustive searches (the size of search zone is [−16; 16] pixels, block size is 16×16 pixels). The prediction was performed block by block; the block size was 8×8 pixels. Results of the performed analysis are resulted in tables T1, T2 and T3.

Here, the column <<prediction mode>> points to a method of construction of a prediction.

<<Temporal prediction: Virtual ME/MC>> points to usage of a method of obtaining of virtual motion vectors by the synthesized frames. Virtual motion vectors are applied then to coding of normal frames.

<<Temporal prediction: ME/MC by encoded frames>> points to usage of a method of obtaining of motion vectors by normal frames. The obtained motion vectors are applied then to coding of normal frames.

The obvious choice between a prediction by time axis and axis of views assumes construction of a prediction which gives the best accuracy of approximation of an encoded frame.

Table T1, T2, T3: Efficiency of an interframe prediction for various degrees of compression for base sequence of frames and maps of depths.

TABLE T1

Left view and depths are not compressed.
Number of pixels, which are occlusions: 8.5%
Number of processed frames: 19 (MVV:« Book arrival »)
Type of procedure of synthesis: one-sided 1-D synthesis, the integer buffer of depth for detection of occlusion, accuracy of computation of value of disparity: ¼ - pixel.

| Mode of prediction | PSNR, dB of predictor concerning an encoded frame |
|---|---|
| Prediction based on VDir | 38.05 |
| Prediction based on MDir | 38.29 |
| Prediction based on MDir + $\Delta\Delta$ | 38.52 |
| Temporal prediction: Virtual ME/MC | 36.41 |
| Temporal prediction: ME/MC by encoded frames | 37.03 |
| Prediction from virtual frames | 34.21 |
| Obvious choice of a primary mode of a prediction: prediction from virtual frames or temporal prediction by encoded frames | 38.75 |

TABLE T2

Left view and depths are compressed MVC: QpV = 26, QpD = 28.
Number of pixels, which are occlusions: 9%
Number of processed frames: 19 (MVV:« Book arrival »)
Type of procedure of synthesis: one-sided 1-D synthesis, the integer buffer of depth for detection of occlusion, accuracy of computation of value of disparity: ¼ - pixel.

| Mode of prediction | PSNR, dB of predictor concerning an encoded frame |
|---|---|
| Prediction based on VDir | 37.48 |
| Prediction based on MDir | 37.75 |
| Prediction based on MDir + $\Delta\Delta$ | 37.97 |
| Temporal prediction: Virtual ME/MC | 36.20 |
| Temporal prediction: ME/MC by encoded frames | 36.98 |
| Prediction from virtual frames | 34.04 |
| Obvious choice of a primary mode of a prediction: prediction from virtual frames or temporal prediction by encoded frames | 38.27 |

TABLE T3

Left view and depths are compressed MVC: QpV = 40, QpD = 42.
Number of pixels, which are occlusions: 9%
Number of processed frames: 19 (MVV: «Book arrival»)
Type of procedure of synthesis: one-sided 1-D synthesis, the integer
buffer of depth for detection of occlusion, accuracy of computation
of value of disparity: ¼ - pixel.

| Mode of prediction | PSNR, dB of predictor concerning an encoded frame |
|---|---|
| Prediction based on VDir | 32.24 |
| Prediction based on MDir | 32.46 |
| Prediction based on MDir + ΔΔ | 32.56 |
| Temporal prediction: Virtual ME/MC | 32.05 |
| Temporal prediction: ME/MC by encoded frames | 33.23 |
| Prediction from virtual frames | 30.81 |
| Obvious choice of a primary mode of a prediction: prediction from virtual frames or temporal prediction by encoded frames | 33.213 |

According to the obtained experimental results, the present disclosure provides essential quality improvement in comparison with known methods of interframe decorrelation, which are based on estimation and the subsequent compensation of motion.

Another distinctive feature of the present disclosure is usage of three-dimensional features of MVV. The synthesized frames, corresponding to the encoded frame and its direct neighbors, form a unique causal context, which is unavailable at coding of normal video sequence or independent coding of video sequences of MVV. This context is accessible both at coding, and at decoding, and is used for the selection of the mode of prediction of each subsequent block of an encoded frame. It allows for performance of effective decorrelation of the data and for reduction of the size of the additional information necessary for the subsequent decoding. Thus, the present disclosure allows for an increase in efficiency of coding.

Figure 14:
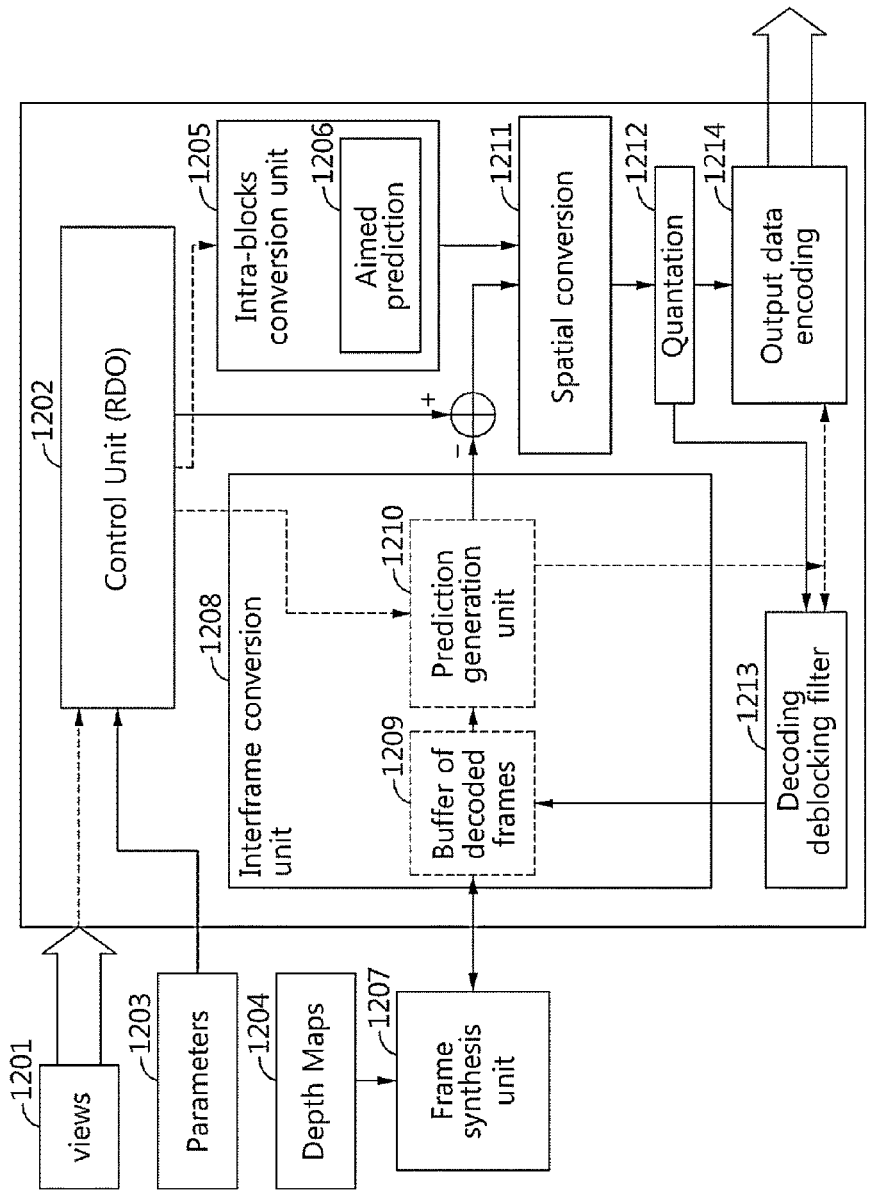
FIG. 14, view 12.1—Structure of standard encoder of the MVV sequence based on the MVC encoder and considering the information on already encoded and decoded information of scene depth, according to an example embodiment.
Figure 15:
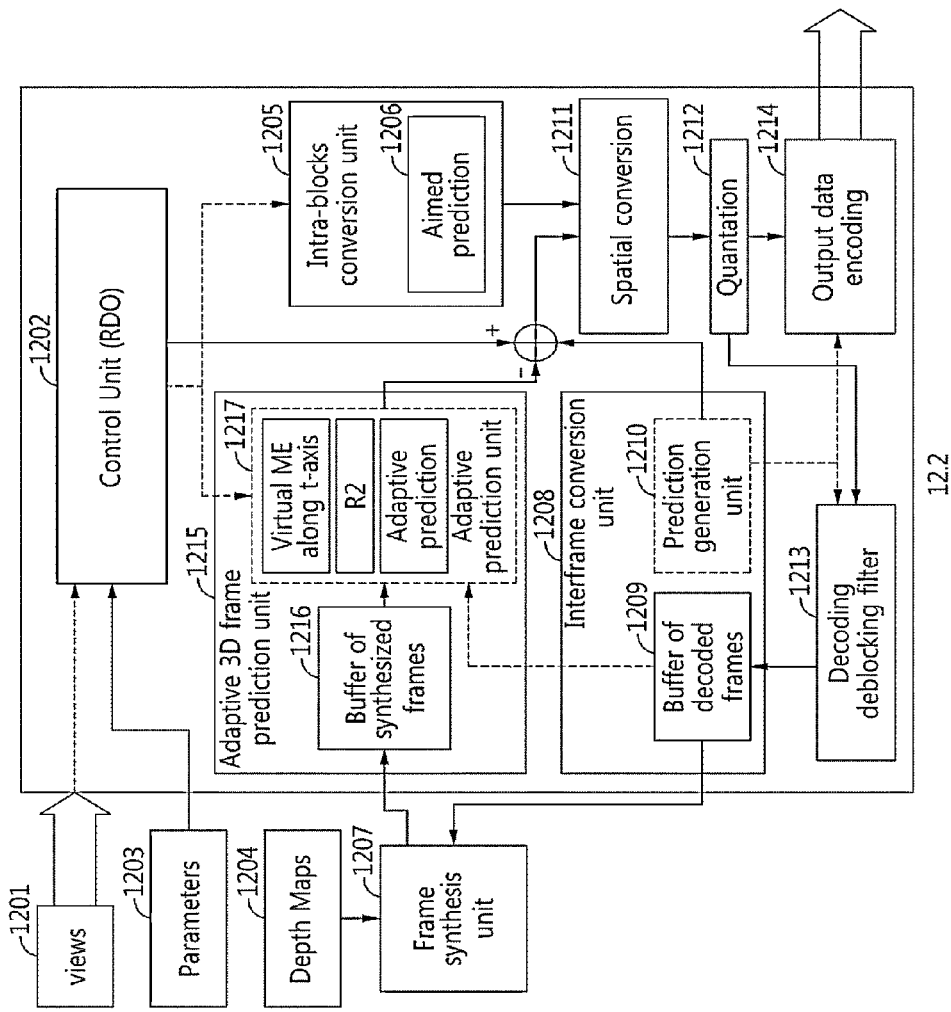
FIG. 15 view 12.2—Structure of encoder of MVV sequence which is based on an offered method of an adaptive prediction of a frame, according to an example embodiment.

Block diagrams of devices for the coding of MVV, based on a method of hybrid coding, are shown in FIG. 14, view 12.1 and FIG. 15, view 12.2, for example. The device for coding, which realizes the approaches, offered in standard H.264/MPEG-4 AVC for coding of MVV, is shown in FIG. 14, view 12.1. Along with the standard for devices of coding of normal video sequences by blocks (i.e., intraframe conversion 1205, so-called, <<intra>>), there is also spatial conversion 1211, which is a device of the control unit 1202 etc. Further, the blocks specific for coding of MVV are presented below:

the block 1210 (prediction generation unit 1210) of creation of a prediction (the extension of standard tools of motion estimation for frames of different video sequences of one MVV), and the block 1207 (frame synthesis unit 1207) of synthesis of the frames, made with capability of creation of the synthesized frames, which then can act as reference during performing of prediction.

The suboptimal selection of a prediction is performed using lists of frames-predictions. Such choice is named suboptimal as the order of selection of a prediction is fixed, generally. However, changing this generally fixed order during coding, may make obvious coding and transmission of the additional information to increase efficiency of coding necessary.

The modified process of the device of coding, realizing the offered method of an adaptive prediction, is shown on FIG. 15, view 12.2. The selection of a prediction using the lists of frames-predictors is replaced by an adaptive prediction which is realized by the block 1215 (adaptive 3D frame prediction unit 1215) of adaptive prediction. This block functions according to the description mentioned above and does not generate the additional information of motion in frames.

The present disclosure provides the flexible mechanism of reduction of amount of the additional information and adaptive decorrelation of a frame in the case of coding of 3D MVV. Example embodiments of the present disclosure may be organically included in the structure of existing and future systems of encoding, for example, in the structure of a system of encoding that is based on the standard H.264/MPEG-4 AVC, due to the information accessible to the encoder and the decoder, and also the incremental order of the coding. The present disclosure supports a compatibility mode with the standard H.264/MPEG-4 AVC for different structures of creation of a prediction and uses a causal context of coding of frames. Arising additional computing load during decoding is removed, in particular, by usage of specialized methods of motion estimation, which possess small computing expenses. It should be noted also that the present disclosure, including all possible variants of its implementation, may be combined with other methods for further improvement of results during coding of MVV.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on non-transitory computer-readable media comprising computer-readable recording media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

Further, according to an aspect of the embodiments, any combinations of the described features, functions and/or operations can be provided.

Moreover, the example embodiments of the present disclosure may be implemented by at least one processor to execute at least one of the above-described units and methods.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A method of coding a multiview video sequence, in which a multiview sequence of depth maps is included, the method comprising:

representing as a set of non-overlapping blocks of pixels each new coded frame of the multiview video sequence, determined in accordance with a preset coding order;

detecting at least one already encoded frame, corresponding to a given view and designating it as a reference frame, generating synthesized frames for encoded and reference frames, wherein for each non-overlapping block of pixels of the encoded frame designated as a block to be encoded, a spatial-combined block of a respective synthesized frame of the synthesized frames is determined, corresponding to the encoded frame, and designated as a virtual block, for which a spatial position of the block of pixels is determined in the respective synthesized frame corresponding to the reference frame, such that the reference virtual block so determined, is a most accurate numerical approximation of the virtual block; for the reference virtual block determined in such way, the spatial-combined block is determined, belonging to the reference frame designated as the reference block, and computing an error between the virtual block and the reference virtual block, and an error between the reference virtual block and the reference block;

selecting the minimum of these errors and determining, at least, one mode of difference coding, based on the selected error; and setting which of the detected blocks are necessary for generation of prediction at the subsequent difference coding of the block to be encoded, and the difference coding of the block to be encoded, is performed in accordance with the selected mode of difference coding.

2. The method of claim 1, wherein when the error between the virtual block and the reference virtual block is less than the error between the reference virtual block and the reference block, the mode of difference coding is selected such that the reference block is used as the prediction;

otherwise the mode of difference coding is selected such that the virtual block is used as the prediction.

3. The method of claim 2, wherein an error between the virtual block and the block to be encoded, is computed, and an error between the reference block and the block to be encoded, is computed, and, when the error between the virtual block and the block to be encoded, is less than an error between the reference block and the block to be encoded, the virtual block is selected as the prediction;

otherwise the reference block is selected; based on the selected mode of difference coding and the selected block, coding of data of the selected block is performed, and also the difference coding of the block to be encoded is performed.

4. The method of claim 3, wherein, when the error relating to the selected mode of difference coding at which the reference block is selected as a prediction, and the minimum detected error is an error between the virtual block and the encoded block, and the detected absolute difference between these errors does not exceed predefined threshold value, then the reference block is selected as a prediction;

when the error relating to the selected mode of difference coding at which the virtual block is selected as a prediction, and the minimum detected error is an error between the reference block and the encoded block, and the detected absolute difference between these errors does not exceed predefined threshold value, then the virtual block is selected as a prediction; otherwise the block, according to a specified mode of coding, is selected as a prediction; coding of data of the selected block is performed, and difference coding of the encoded block is performed.

5. The method of claim 4, wherein the reference virtual block and the reference block are used for computation of the difference block, and the difference block is computed as a pixel-by-pixel difference between the virtual block and a pixel-by-pixel difference between the reference virtual block and the reference block;

an error between the detected difference block and the encoded block is computed;

when the detected error is less than an error between the block, selected on the previous steps as a predictor, and the encoded block, then the detected difference block is used as a predictor; and coding of data of the selected block is performed, and difference coding of the encoded block is performed.

6. The method of claim 1, wherein at least one of one-sided synthesis and two-sided synthesis is performed in order to generate the synthesized frames.

7. The method of claim 1, further comprising:

determining an optimum mode of prediction, among a temporal mode of prediction and a parallax mode of prediction, based on a comparison of the error between the virtual block and the reference virtual block, and the error between the reference virtual block and the reference block.

8. An apparatus for coding a multiview video sequence, in which a multiview sequence of depth maps is included, the apparatus comprising:

a control unit configured to receive an input of the multiview video sequence;

a frame synthesis unit configured to generate synthesized frames for reference frames corresponding to the input, using the multiview sequence of depth maps, wherein the synthesized frames are spatially-combined;

for each non-overlapping block of pixels of the reference frames designated as a block to be encoded, a spatial-combined block of a respective synthesized frame, corresponding to a reference frame, of the synthesized frames is determined and designated as a virtual block, and a spatial position of the spatial-combined block of pixels is determined in the respective synthesized frame corresponding to the reference frame; and an adaptive three-dimensional (3D) frame coding unit configured to encode a block of a current frame of the input multiview video sequence using a selected one of a temporal prediction and a parallax prediction based on at least one of the generated synthesized frames, wherein the temporal prediction is based on estimated virtual motion for one or more of the generated synthesized frames and the parallax prediction is based on a comparison of the current frame and a synthesized frame of the generated synthesized frames, wherein the estimated virtual motion is an estimated virtual motion between temporally different synthesized frames.

9. The apparatus of claim 8, wherein the adaptive three-dimensional (3D) frame coding unit is further configured to encode the block of the current frame of the input multiview video sequence using a selected one of the temporal prediction, the parallax prediction, and a second order difference prediction based on the estimated virtual motion between the temporally different synthesized frames and a comparison of the current frame and a current time synthesized frame.

10. The apparatus of claim 9, wherein the second order different prediction is a prediction residue between a first difference, between the current frame and the current time synthesized frame, and a second difference, between a previous frame and a previous synthesized frame both analyzed in view of the estimated virtual motion.

11. The apparatus of claim 8, wherein the estimated virtual motion is an estimated virtual motion for the synthesized frame.

12. An apparatus for coding a multiview video sequence, in which a multiview sequence of depth maps is included, the apparatus comprising:
   a control unit configured to receive an input of the multiview video sequence;
   a frame synthesis unit configured to generate synthesized frames for reference frames, using the multiview sequence of depth maps;
   for each non-overlapping block of pixels of the reference frames designated as a block to be encoded, a spatial-combined block of a respective synthesized frame, corresponding to a reference frame, of the synthesized frames is determined and designated as a virtual block, and a spatial position of the spatial-combined block of pixels is determined in the respective synthesized frame corresponding to the reference frame; and
   an adaptive three-dimensional (3D) frame coding unit configured to encode a block of a current frame of the input multiview video sequence using a selected one of a temporal prediction and a parallax prediction based on at least one of the generated synthesized frames.

* * * * *